(12) United States Patent
Chiga et al.

(10) Patent No.: US 7,335,446 B2
(45) Date of Patent: Feb. 26, 2008

(54) NON-AQUEOUS ELECTROLYTE SECONDARY BATTERY

(75) Inventors: Takanobu Chiga, Kobe (JP); Katsunori Yanagida, San Diego, CA (US); Atsushi Yanai, Kobe (JP); Yoshinori Kida, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 528 days.

(21) Appl. No.: 11/064,112

(22) Filed: Feb. 23, 2005

(65) Prior Publication Data

US 2005/0196674 A1    Sep. 8, 2005

(30) Foreign Application Priority Data

Feb. 24, 2004    (JP)    ............... 2004-048591

(51) Int. Cl.
*H01M 4/58*    (2006.01)
(52) U.S. Cl. ............... 429/231.3; 429/231.1; 429/231.5; 429/231.6
(58) Field of Classification Search ............ 429/231.3, 429/231.1, 231.5, 231.6; 252/182.1; 427/126.3, 427/126.4
See application file for complete search history.

(56) References Cited

U.S. PATENT DOCUMENTS 7,135,251 B2 * 11/2006 Cho et al. ............... 429/231.3

2003/0082448 A1    5/2003 Cho et al. ............... 429/218.1
2003/0211391 A1   11/2003 Cho et al. ............... 429/218.1

FOREIGN PATENT DOCUMENTS

| JP | 3045998 B2 | 3/2000 |
| JP | 2003-7299 A | 1/2003 |
| JP | 2003-331846 A | 11/2003 |

* cited by examiner

*Primary Examiner*—Laura Weiner
(74) *Attorney, Agent, or Firm*—Kubovcik & Kubovcik

(57) ABSTRACT

Cycle performance is improved without degrading initial efficiency of a non-aqueous electrolyte secondary battery that includes a positive electrode, a negative electrode, a non-aqueous electrolyte containing a solute and a solvent, the positive electrode including a positive electrode active material made of a lithium-containing transition metal oxide that contains lithium and cobalt and has a layered structure. The lithium-containing transition metal oxide is at least partially covered with a surface-treatment layer containing a phosphate compound represented by the chemical formula $M^1PO_k$, where $M^1$ is at least one element that can have a valency of 3 and k is an integer in a range of 2 to 4, and the lithium-containing transition metal oxide contains a group IVA element $M^2$ and a group IIA element $M^3$ of the periodic table.

20 Claims, 1 Drawing Sheet

NON-AQUEOUS ELECTROLYTE SECONDARY BATTERY

BACKGROUND OF THE INVENTION

1. Field of the Invention

The present invention relates to non-aqueous electrolyte secondary batteries.

2. Description of Related Art

In recent years a non-aqueous electrolyte secondary battery has drawn attention as a high energy density battery. The non-aqueous electrolyte secondary battery comprises a negative electrode active material employing a metallic lithium, or an alloy or a carbon material that is capable of intercalating and deintercalating lithium ions, and a positive electrode material employing a lithium-containing transition metal oxide represented by the chemical formula $LiMO_2$ (where M is a transition metal). For the electrolyte solution, cyclic carbonates such as ethylene carbonate and propylene carbonate, cyclic esters such as y-butyrolactone, and chain carbonates such as dimethyl carbonate and ethyl methyl carbonate, are used either alone or in combination.

A representative example of the lithium-containing transition metal oxide used for the positive electrode is lithium cobalt oxide ($LiCoO_2$), which has already been in commercial use as a positive electrode active material for non-aqueous electrolyte secondary batteries. A problem with the use of the lithium-containing transition metal oxide having a layered structure, such as represented by lithium cobalt oxide, alone as the positive electrode active material, however, is that, because the positive electrode active material undergoes change in volume associated with a charge-discharge process, capacity degradation occurs as the charge-discharge process is repeated; that is, cycle performance deteriorates.

Japanese Unexamined Patent Publication Nos. 2003-7299 and 2003-331846, for example, propose that, in order to improve cycle performance of the positive electrode active material, lithium cobalt oxide is used for the positive electrode, and the surface thereof is treated with $MXO_k$, especially with an aluminum phosphate compound represented by $AlPO_k$. Although the treatment of the surface of lithium cobalt oxide with an aluminum phosphate improves cycle performance, a problem is that the initial efficiency of the positive electrode active material degrades.

In addition, many attempts have been made to improve cycle performance by addition of another element to the positive electrode active material, or substitution therewith, and one example of the attempts is the addition of zirconium, magnesium, or the like to the positive electrode active material (cf. Japanese Patent No. 3045998). However, the addition of another element to the lithium-containing transition metal oxide also causes the problem of the degradation in initial efficiency.

In recent years, the demand for batteries with higher energy density has been growing greatly, and accordingly, materials having a greater initial charge-discharge efficiency are desired for both the positive electrode active material and the negative electrode active material. Since the techniques proposed in the foregoing patent publications bring about the degradation in initial efficiency of the positive electrode active material, the techniques are undesirable from the standpoint of attaining higher energy density batteries. In particular, when an active material with a high initial charge-discharge efficiency such as graphite is used as the negative electrode active material, the initial efficiency of the positive electrode has a great influence on the energy density of the battery, and an improvement in the initial efficiency has been desired as well as improvements in various characteristics of the positive electrode.

BRIEF SUMMARY OF THE INVENTION

Accordingly, it is an object of the present invention to provide a non-aqueous electrolyte secondary battery capable of achieving improved cycle performance without degrading initial efficiency.

The present invention provides a non-aqueous electrolyte secondary battery comprising: a positive electrode, a negative electrode, and a non-aqueous electrolyte containing a solute and a solvent, the positive electrode including a positive electrode active material comprising a lithium-containing transition metal oxide that contains lithium and cobalt and has a layered structure; wherein the lithium-containing transition metal oxide is at least partially covered with a surface-treatment layer comprising a phosphate compound represented by the chemical formula $M^1PO_k$, where $M^1$ is at least one element capable of having a valency of 3 and k is an integer in a range of 2 to 4, and the lithium-containing transition metal oxide contains a group IVA element $M^2$ and a group IIA element $M^3$ of the periodic table.

DETAILED DESCRIPTION OF THE INVENTION

Figure 1:
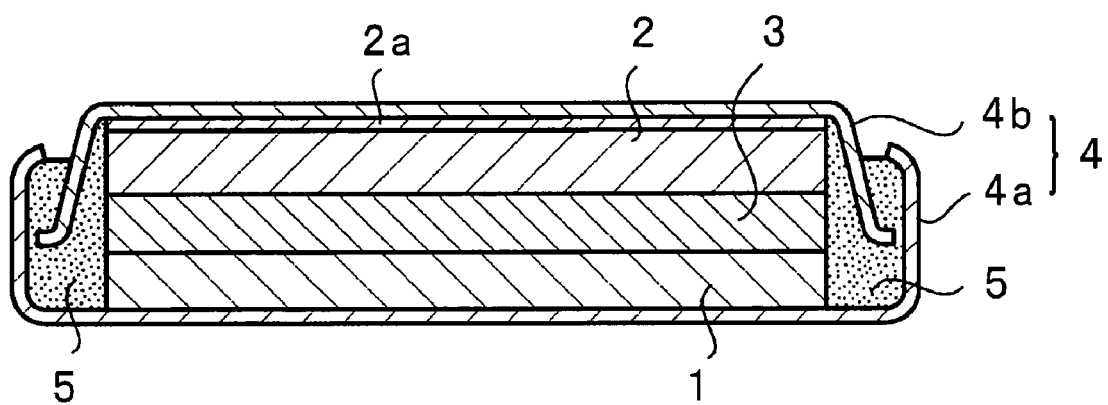
FIG. 1 is a cross-sectional view illustrating a lithium secondary battery fabricated in the Example according to the present invention.

According the present invention, the lithium-containing transition metal oxide is covered with a surface-treatment layer comprising the above-described phosphate compound, and the lithium-containing transition metal oxide is allowed to contain the elements $M^2$ and $M^3$, whereby cycle performance can be improved without degrading the initial efficiency. Specifically, the conventional technique of simply covering the lithium-containing transition metal oxide with a surface-treatment layer and the conventional technique of simply adding the elements $M^2$ and $M^3$ to the lithium-containing transition metal oxide, although capable of improving cycle performance, have suffered because of a degradation in initial efficiency. In contrast, the present invention has made it possible to improve cycle performance without degrading initial efficiency by covering the lithium-containing transition metal oxide with a surface-treatment layer and adding the elements $M^2$ and $M^3$ thereto.

Although the mechanism of the degradation in the initial efficiency caused by the formation of the surface-treatment layer is not clearly understood, it is believed that a cause of this may be an irreversible reaction between the surface-treatment layer and an electrolyte solution. It is inferred that this irreversible reaction causes the initial efficiency of the positive electrode active material to degrade. Likewise, the mechanism of the deterioration in the initial efficiency caused by the addition of a group IVA element $M^2$ and a group IIA element $M^3$ is also unclear, but it is believed that the initial efficiency degrades because the adding of the elements $M^2$ and $M^3$ causes the reversibility of the lithium-containing transition metal oxide to degrade, or causes a reaction to occur between the electrolyte solution and a compound containing the element $M^2$ and/or the element $M^3$ that exist(s) on the surface. Nevertheless, the degradation in the initial efficiency does not occur when, in accordance with the present invention, the lithium-containing transition metal oxide containing the elements $M^2$ and $M^3$ is subjected to the surface treatment. Although the reason is not fully understood, it is believed that the interaction between the surface treatment and the lithium-containing transition metal oxide containing the elements $M^2$ and $M^3$ restrains the reaction that causes the degradation in the initial efficiency.

Illustrative examples of the lithium-containing transition metal oxide in the present invention include lithium-containing nickel-cobalt composite oxide ($LiNi_{1-x}Co_xO_2$) and lithium cobalt oxide ($LiCoO_2$), as well as a substance in which the nickel or cobalt in these oxides is substituted by another transition metal, a substance in which the nickel is substituted by cobalt and manganese, and a substance in which the cobalt is substituted by nickel and manganese. Among them, lithium cobalt oxide is particularly preferable.

In the present invention, the phosphate compound that forms the surface-treatment layer is a phosphate compound represented by the chemical formula $M^1PO_k$, where $M^1$ is at least one element that can have a valency of 3, and k is an integer in a range of 2 to 4. The element $M^1$ is preferably at least one element selected from the group consisting of aluminum (Al), yttrium (Y), lanthanum (La), cerium (Ce), chromium (Cr), manganese (Mn), iron (Fe), cobalt (Co), and nickel (Ni). More preferable among them are aluminum (Al), yttrium (Y), lanthanum (La), and cerium (Ce), and still more preferable is aluminum (Al).

In the present invention, the content of the element $M^1$ is preferably in a range of 0.01 mole % to 10 mole %, and is more preferably in a range of 0.05 mole % to 6 mole %, with respect to the total content of the metal elements other than lithium in the positive electrode active material. If the content of $M^1$ is too large, the discharge capacity of the positive electrode active material reduces, whereas if it is too small, the effect of improvement in the cycle performance due to the surface treatment cannot be attained sufficiently. It should be noted that the term the "metal elements other than lithium in the positive electrode active material" means the transition metal(s) contained in the lithium-containing transition metal oxide on which the surface-treatment layer has not yet been formed or to which the group IVA element $M^2$ and the group IIA element $M^3$ have not yet been added, the element $M^1$ added thereto by the formation of the surface-treatment layer, and the elements $M^2$ and $M^3$ contained in the lithium-containing transition metal oxide.

In the present invention, the technique of forming the surface-treatment layer is not particularly limited as long as a layer of the phosphate compound is formed on the surface of the lithium-containing transition metal oxide. One example of the surface treatment technique is a method in which a phosphate compound is added to a coating solution and the coating solution is mixed with the lithium-containing transition metal oxide. Examples of the solvent of the coating solution include water, alcohols such as methanol, ethanol, and isopropanol, and acetone. The coating solution may be a solution in which the phosphate compound is dissolved, or may be a suspension in which the phosphate compound is suspended.

In the present invention, it is preferable that annealing be performed after the phosphate compound has been allowed to adhere onto the lithium-containing transition metal oxide. By performing annealing in this manner, the surface-treatment layer composed of the phosphate compound is allowed to adhere firmly onto the surface of the lithium-containing transition metal oxide. It is preferable that the annealing be performed at a temperature of 200° C. to 800° C., and more preferably at a temperature of 400° C. to 700° C. It is preferable that the annealing time be from 1 to 20 hours. If the annealing temperature is too low or if the annealing time is too short, the surface-treatment layer may not adhere firmly onto the surface of the lithium-containing transition metal oxide Conversely, if the annealing temperature is too high or the annealing time is too long, the compound in the surface-treatment layer may diffuse into the lithium-containing transition metal oxide, decreasing the capacity of the active material.

The surface-treatment layer in the present invention may contain a compound produced during the annealing by the reaction between the phosphate compound in the surface-treatment layer and the lithium-containing transition metal oxide containing the elements $M^2$ and $M^3$. It should be noted that in the present invention the surface-treatment layer does not need to cover the entire surface of the lithium-containing transition metal oxide, but needs only to cover at least a portion of the surface.

In addition, when performing the annealing, impurities are produced in some cases in the lithium-containing transition metal oxide. For example, when lithium cobalt oxide ($LiCoO_2$) is used, tricobalt tetroxide ($CO_3O_4$) is produced as an impurity. However, it is preferable that the amounts of such impurities be minimized by controlling the coating method, or adjusting the annealing temperature and annealing time.

It is preferable that, for the positive electrode active material in the present invention, the half-width of the peak in the vicinity of 595 $cm^{-1}$ determined by Raman spectroscopy be 13.0 $cm^{-1}$ or greater. The peak in the vicinity of 595 $cm^{-1}$ originates from the vibration of the c-axis direction of the lithium-containing transition metal oxide that contains lithium and cobalt and has a layered structure. When the half-width of this peak becomes 13.0 $cm^{-1}$ or greater, it means that the crystallinity of the surface has been reduced.

For example, the half-width in the vicinity of 595 $cm^{-1}$ in lithium cobalt oxide is about 11 $cm^{-1}$, but when the lithium cobalt oxide containing Zr as the element $M^2$ and Mg as the element $M^3$ is subjected to the surface treatment, the half-width of the peak in the vicinity of 595 $cm^{-1}$ results in 13.0 $cm^{-1}$ or greater. This is probably because the surface-treatment layer that has an effect of restricting an irreversible reaction with the electrolyte solution is formed on the surface of the lithium cobalt oxide, and as a result, the crystallinity of the lithium cobalt oxide itself reduces, increasing the half-width to 13.0 $cm^{-1}$ or greater.

It should be noted that in the present invention, the half-width of the peak in the vicinity of 595 $cm^{-1}$ is a value obtained by performing laser Raman spectroscopy under the conditions as set forth below. The measurement is performed three times or more and the values obtained are averaged. The laser Raman spectroscopy equipment used is T64000 made by Horiba Jobin Yvon Ltd.

| Measurement conditions: | |
| --- | --- |
| Measurement mode | Macro Raman |
| Beam diameter | 100 μm |
| Light source | $Ar^+$ laser/514.5 nm |
| Laser power | 20 mW |
| Diffraction grating | Spectrograph 1800 gr/mm |
| Scattering | Single 7 A/mm |
| Slit | 100 μm |
| Detector | CCD (Jobin Yvon 1024 × 256) |

The lithium-containing transition metal oxide in the present invention contains a group IVA element $M^2$ and a group IIA element $M^3$ of the periodic table. These elements can be added to the lithium-containing transition metal oxide by adding compounds of these elements (for example, oxides, carbonates, or hydroxides thereof) into a source material when preparing the lithium-containing transition metal oxide.

It is preferable that the element $M^2$ be at least one element selected from the group consisting of zirconium (Zr), titanium (Ti), and hafnium (Hf), and particularly preferable is zirconium. Preferable examples of the element $M^3$ include beryllium (Be), magnesium (Mg), calcium (Ca), strontium (Sr), and barium (Ba), and particularly preferable is magnesium.

It is preferable that the total content of the elements $M^2$ and $M^3$ in the lithium-containing transition metal oxide be 5 mole % or less with respect to the total content of metal elements other than lithium in the positive electrode active material, and more preferably, 3 mole % or less. If the elements $M^2$ and $M^3$ are contained too much, the charge-discharge characteristics degrade. It is also preferable that the lower limit value of the total content of the elements $M^2$ and $M^3$ be 0.5 mole % or greater. If the content of these elements becomes too little, the initial efficiency may reduce in some cases when the surface treatment is performed.

When the content (mole %) of the element $M^2$ and the content (mole %) of the element $M^3$ are represented as x mole % and y mole %, respectively, it is preferable that the total content x+y be $0<x+y\leq5$, more preferably $0<x+y\leq3$, and still more preferably $0.5\leq x+y\leq3$, as described above.

Moreover, it is preferable that the elements $M^2$ and $M^3$ are contained in substantially equimolar amounts in the lithium-containing transition metal oxide. Accordingly, x and y satisfy the following expressions $0.45\leq x/(x+y)\leq0.55$ and $0.45\leq y/(x+y)\leq0.55$. Although the reason is not clear, it is believed that the elements $M^2$ and $M^3$ should preferably exist in as equal amounts as possible so as to interact with one another, because the coexistence of the elements $M^2$ and $M^3$ is thought to contribute to the effect of preventing the initial efficiency from degrading even when performing the surface treatment.

In the present invention, the elements $M^2$ and $M^3$ contained in the lithium-containing transition metal oxide may exist in the lattices of the lithium-containing transition metal oxide, or may exist on the surface of the lithium-containing transition metal oxide.

Further, in the present invention, it is preferable that a conductive agent be contained in the positive electrode. When a carbon material is added as the conductive agent, it is preferable that the content of the carbon material be 7 weight % or less, and more preferably 5 weight % or less, with respect to the total content of the positive electrode active material, the conductive agent, and a binder agent. The reason is that the capacity decreases if the amount of the conductive agent is too large. Meanwhile, it is preferable that the amount of the conductive agent be 1 weight % or greater. The reason is that if the amount of the conductive agent is too little, the conductivity in the positive electrode reduces, decreasing the utilization factor.

In the present invention, the negative electrode material used for the negative electrode may be any negative electrode material that has been conventionally used for non-aqueous electrolyte secondary batteries. Examples include metallic lithium; lithium alloys such as lithium-aluminum alloy, lithium-lead alloy, lithium-silicon alloy, and lithium-tin alloy; carbon materials such as graphite, coke, and sintered organic materials; as well as metal oxides whose potentials are lower than that of the positive electrode active material, such as $SnO_2$, SnO, and $TiO_2$.

The solvent used in the present invention may be any solvent that has conventionally been used as a solvent for non-aqueous electrolyte secondary batteries. Examples of the solvent include cyclic carbonic esters such as ethylene carbonate, propylene carbonate, 1,2-butylene carbonate, and 2,3-butylene carbonate; cyclic esters such as γ-butyrolactone and propane sultone; chain carbonic esters such as methyl ethyl carbonate, diethyl carbonate, and dimethyl carbonate; chain ethers such as 1,2-dimethoxyethane, 1,2-diethoxyethane, diethyl ether, and ethyl methyl ether; as well as methyl acetate, ethyl acetate, propyl acetate, methyl propionate, ethyl propionate, tetrahydrofuran, 2-methyltetrahydrofuran, 1,4-dioxane, and acetonitrile.

Additionally, when vinylene carbonate or vinyl ethylene carbonate used in the present example is added to the non-aqueous electrolyte solution, a stable coating film that shows outstanding mobility of lithium ions can be formed on the negative electrode surface.

The solute of the non-aqueous electrolyte solution used in the present invention may be, for example, any lithium salt that has conventionally been used for non-aqueous electrolyte secondary batteries. Examples of such a lithium salt include $LiPF_6$, $LiBF_4$, $LiCF_3SO_3$, $LiClO_4$, $LiN(C_2F_5SO_2)_2$, $LiN(CF_3SO_2)(C_4F_9SO_2)$ $LiC(CF_3SO_2)_3$, $LiC(C_2F_5SO_2)_3$, $LiAsF_6$, $Li_2B_{10}Cl_{10}$, and $Li_2B_{12}Cl_{12}$.

According to the present invention, cycle performance can be improved without degrading the initial efficiency by coating a lithium-containing transition metal oxide containing a group IVA element $M^2$ and a group IIA element $M^3$ of the periodic table with a surface-treatment layer made of a specific phosphate compound, and using this as the positive electrode active material.

EXAMPLES

Hereinbelow, the present invention is described in further detail by way of examples thereof. It should be construed, however, that the present invention is not limited to the following examples but various changes and modifications are possible unless such changes and variations depart from the scope of the invention.

Example 1

Preparation of Positive Electrode Active Material $Li_2CO_3$, $Co_3O_4$, $ZrO_2$, and MgO were mixed using an Ishikawa-type Raikai mortar so that the mole ratio of Li:Co:Zr:Mg became 1:0.99:0.005:0.005, and the mixture was then annealed at 850° C. for 24 hours in an air atmosphere and thereafter pulverized. Thus, a lithium cobalt oxide containing Zr and Mg and having a layered structure was obtained, which had an average particle diameter of 13.5 μm. The BET specific surface area was 0.38 $m^2$/g.

The lithium cobalt oxide containing Zr and Mg thus obtained was subjected to a surface treatment in the following manner. First, 2.31 g of $Al(NO_3)_3 \cdot 9H_2O$ and 0.97 g of $(NH_4)_2HPO_4$ were dissolved into 160 mL pure water to obtain a solution in which white amorphous aluminum phosphate was dispersed. This white amorphous aluminum phosphate was collected by centrifugal separation, and thereafter, dispersed into pure water again to prepare a coating solution. To this coating solution, 25 g of the lithium cobalt oxide containing Zr and Mg was added; after stirring, the solution was subjected to a solid-liquid separation by vacuum filtration. The resultant powder was annealed at 700° C. for 5 hours, and thus, a positive electrode active material was obtained on which a surface-treatment layer containing aluminum phosphate was formed.

The resultant positive electrode active material was analyzed by laser Raman spectroscopy. As a result, it was found that the half-width of the peak in the vicinity of 595 cm$^{-1}$ was 13.2 cm$^{-1}$. The content of Al contained in the resultant positive electrode active material was measured by ICP spectroscopy. The content of Al was found to be 0.84 mole % with respect to the total content of Co, Zr, Mg, and Al.

Preparation of Positive Electrode

To the positive electrode active material thus obtained, carbon as a conductive agent, poly(vinylidene fluoride) as a binder, and N-methyl-2-pyrrolidone as a dispersion medium were added so that the weight ratio of the active material, the conductive agent, and the binder became 90:5:5. The resultant material was then kneaded to prepare a positive electrode slurry. The slurry thus prepared was coated on an aluminum foil serving as a current collector, then dried, and thereafter rolled using reduction rollers. Then, the rolled material was cut into a circular plate having a diameter of 20 mm to prepare a positive electrode (working electrode). The content of the carbon material here was 5 weight % with respect to the total of the positive electrode active material, the conductive agent, and the binder.

Preparation of Negative Electrode

A circular plate having a diameter of 20 mm was stamped out from a rolled lithium plate having a predetermined thickness to prepare a negative electrode (counter electrode).

Preparation of Electrolyte solution

Lithium hexafluorophosphate (LiPF$_6$) was dissolved in a solvent in which ethylene carbonate and ethyl methyl carbonate were mixed at a volume ratio of 30:70 so that the concentration of LiPF$_6$ became 1.0 mole/L. To 100 parts by weight of the resultant solution, 2 parts by weight of vinylene carbonate was added as an addition agent to prepare a non-aqueous electrolyte.

Assembling of Test Cell

As illustrated in FIG. 1, a separator 3 made of a microporous polyethylene film was sandwiched between the positive electrode (working electrode) 2 and the negative electrode (counter electrode) 1. Next, a positive electrode current collector 2a was brought into contact with a top lid 4b of a battery can 4 of the test cell, and the negative electrode 1 was brought into contact with a bottom portion 4a of the battery can 4. These were accommodated into the battery can 4, and the top lid 4b and the bottom portion 4a were electrically insulated with an insulative packing 5. A test cell (non-aqueous electrolyte secondary battery) A1 according to the present invention was thus fabricated.

Performance Evaluation

The assembled test cell A1 was charged at 25° C. with a constant current of 0.75 mA/cm$^2$ until the voltage of the test cell reached 4.3 V, and further charged with a constant current of 0.25 mA/cm$^2$ until the voltage of the test cell reached 4.3 V again. Thereafter, the test cell was discharged with a constant current of 0.75 mA/cm$^2$ until the voltage reached 2.75 V. Thus, the initial charge capacity $C_1$ (mAh) and the initial discharge capacity $D_1$ (mAh) of the test cell were measured.

The ratio of initial discharge capacity ($D_1$) to initial charge capacity ($C_1$), i.e., initial efficiency CE (%) was obtained by the following equation. A greater CE value indicates that a battery with a higher capacity can be obtained.

$$CE = D_1/C_1 \times 100 (\%)$$

Further, the above-described charge-discharge process was performed 30 cycles, and the ratio of discharge capacity at cycle 30 $D_{30}$ (mAh) to initial discharge capacity $D_1$ (mAh), i.e., capacity retention ratio $T_{30}$ (%) after cycle 30, was obtained by the following equation. A greater $T_{30}$ value indicates that the battery obtained shows better cycle performance and retains a high capacity even after the charge-discharge process has been repeated.

$$T_{30} = D_{30}/D_1 \times 100 \; (\%)$$

Comparative Example 1

A comparative test cell B1 was fabricated in the same manner as in Example 1 except that lithium cobalt oxide containing Zr and Mg was used as the positive electrode active material without subjecting it to the surface treatment in the preparation of the positive electrode active material in Example 1. The initial efficiency and capacity retention ratio after cycle 30 of the cell were measured in the same manner as in the foregoing.

The resultant positive electrode active material was analyzed by laser Raman spectroscopy, and the half-width of the peak in the vicinity of 595 cm$^{-1}$ was found to be 12.6 cm$^{-1}$.

Comparative Example 2

A comparative test cell B2 was fabricated in the same manner as in Example 1 except that the positive electrode active material used was prepared as follows. A simple lithium cobalt oxide was prepared using only Li$_2$CO$_3$ and CO$_3$O$_4$ so that the mole ratio of Li:Co became 1:1 in the preparation of the positive electrode active material in Example 1, and was then subjected to the surface treatment. The initial efficiency and capacity retention ratio after cycle 30 of the cell B2 were evaluated in the same manner as in the foregoing.

The resultant positive electrode active material was analyzed by laser Raman spectroscopy, and as a result, the half-width of the peak in the vicinity of 595 cm$^{-1}$ was found to be 12.8 cm$^{-1}$. The content of Al contained in the resultant positive electrode active material was determined by ICP spectroscopy. The content of Al was found to be 0.84 mole % with respect to the total content of Co and Al.

Comparative Example 3

A comparative test cell B3 was fabricated in the same manner as in Example 1 except that the positive electrode active material used was prepared as follows. A simple lithium cobalt oxide was prepared using only Li$_2$CO$_3$ and CO$_3$O$_4$ so that the mole ratio of Li:Co became 1:1 in the preparation of the positive electrode active material in Example 1, and used as the positive electrode active material without subjecting it to the surface treatment. The initial efficiency and capacity retention ratio after cycle 30 of the cell B3 were evaluated in the same manner as in the foregoing.

The obtained positive electrode active material was analyzed by laser Raman spectroscopy. Consequently, it was found that the half-width of the peak in the vicinity of 595 cm$^{-1}$ was 11.3

It should be noted that in Comparative Examples 1 and 3, the surface treatment was not carried out and accordingly annealing for forming the surface-treatment layer was not performed.

The initial efficiencies and the capacity retention ratios after cycle 30 of the test cell A1 according to Example 1 of the invention and the comparative test cells B1 to B3 according to Comparative Examples 1 to 3, fabricated in the above-described manner, are shown in Table 1 below.

TABLE 1

| | Lithium-containing transition metal oxide | Surface treatment | Initial efficiency CE (%) | Capacity retention ratio after cycle 30 $T_{30}$ (%) |
|---|---|---|---|---|
| A1 | Lithium cobalt oxide containing Zr and Mg | Aluminum phosphate | 97.3 | 99.1 |
| B1 | Lithium cobalt oxide containing Zr and Mg | Not treated | 96.4 | 98.6 |
| B2 | Lithium cobalt oxide | Aluminum phosphate | 96.8 | 93.6 |
| B3 | Lithium cobalt oxide | Not treated | 97.5 | 90.6 |

The results shown in Table 1 clearly demonstrate that when lithium cobalt oxide is used as the positive electrode active material (B3), the cycle performance is very poor although the initial efficiency is good. On the other hand, by subjecting lithium cobalt oxide to the surface treatment (B2), a problem arises that the initial efficiency degrades although the cycle performance improves.

Further, with the lithium cobalt oxide containing zirconium and magnesium (B1), a problem is that the initial efficiency is low although the cycle performance is good.

In contrast, Example 1 (A1) according to the present invention, in which lithium cobalt oxide containing zirconium and magnesium was subjected to the surface treatment, showed an initial efficiency comparable to that of the cell using lithium cobalt oxide alone (B3), indicating that the reduction in the initial efficiency due to the surface treatment did not occur. Furthermore, the cycle performance is improved over those of B1 and B2.

By subjecting lithium cobalt oxide containing zirconium and magnesium to a surface treatment according to the present invention, the effect of improvement in cycle performance was acknowledged while the degradation in initial efficiency, such as caused when surface-treating a conventional lithium cobalt oxide, did not occur.

In the above-described example, two electrode batteries using lithium metal were prepared to compare initial efficiency and cycle performance. However, similar effects can be obtained even when an alloy or a carbon material that is capable of intercalating and deintercalating lithium ions is used as the negative electrode. In addition, the shape of the battery is not particularly limited, and the present invention can be applied to non-aqueous electrolyte secondary batteries of various shapes, such as a cylindrical shape, a box shape, or a flat shape.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese patent application No. 2004-048591, filed Feb. 24, 2004, the disclosure of which is incorporated herein by reference.

What is claimed is:

1. A non-aqueous electrolyte secondary battery comprising: a positive electrode, a negative electrode, and a non-aqueous electrolyte containing a solute and a solvent, the positive electrode including a positive electrode active material comprising a lithium-containing transition metal oxide that contains lithium and cobalt and has a layered structure; wherein
the lithium-containing transition metal oxide is at least partially covered with a surface-treatment layer comprising a phosphate compound represented by the chemical formula $M^1PO_k$, where $M^1$ is at least one element capable of having a valency of 3 and k is an integer in a range of 2 to 4, and the lithium-containing transition metal oxide contains a group IVB element $M^2$ and a group IIA element $M^3$ of the periodic table.

2. The non-aqueous electrolyte secondary battery according to claim 1, wherein the element $M^1$ is at least one element selected from the group consisting of aluminum, yttrium, lanthanum, and cerium.

3. The non-aqueous electrolyte secondary battery according to claim 1, wherein the content of the element $M^1$ is 0.01 mole % to 10 mole % with respect to the total content of metal elements other than lithium in the positive electrode active material.

4. The non-aqueous electrolyte secondary battery according to claim 1, wherein the element $M^1$ is aluminum.

5. The non-aqueous electrolyte secondary battery according to claim 1, wherein the group IVB element $M^2$ is at least one element selected from the group consisting of zirconium, titanium, and hafnium, and the group IIA element $M^3$ is magnesium.

6. The non-aqueous electrolyte secondary battery according to claim 1, wherein the group IVB element $M^2$ is zirconium, and the group IIA element $M^3$ is magnesium.

7. The non-aqueous electrolyte secondary battery according to claim 1, wherein the group IVB element $M^2$ and the group IIA element $M^3$ are contained in substantially equimolar amounts.

8. The non-aqueous electrolyte secondary battery according to claim 1, wherein the lithium-containing transition metal oxide is lithium cobalt oxide.

9. The non-aqueous electrolyte secondary battery according to claim 1, wherein the total content of the group IVB element $M^2$ and the group IIA element $M^3$ is 5 mole % or less with respect to the total content of metal elements other than lithium in the positive electrode active material.

10. The non-aqueous electrolyte secondary battery according to claim 1, wherein the surface-treatment layer is formed by performing annealing after allowing the phosphate compound to adhere onto the lithium-containing transition metal oxide.

11. The non-aqueous electrolyte secondary battery according to claim 10, wherein the annealing is performed at a temperature of 200° C. to 800° C.

12. The non-aqueous electrolyte secondary battery according to claim 1, wherein the half-width of the peak in the vicinity of 595 cm$^{-1}$ determined by Raman spectroscopy of the positive electrode active material is 13.0 cm$^{-1}$ or greater.

13. A non-aqueous electrolyte secondary battery comprising: a positive electrode, a negative electrode, and a non-aqueous electrolyte containing a solute and a solvent, the positive electrode including a positive electrode active material comprising a lithium-containing transition metal oxide that contains lithium and cobalt and has a layered structure; wherein
the lithium-containing transition metal oxide is at least partially covered with a surface-treatment layer comprising aluminum phosphate, and the lithium-containing transition metal oxide contains zirconium and magnesium.

14. The non-aqueous electrolyte secondary battery according to claim 13, wherein the zirconium and magnesium are contained in substantially equimolar amounts.

15. The non-aqueous electrolyte secondary battery according to claim 13, wherein the total content of the zirconium and magnesium is 5 mole % or less with respect to the total content of metal elements other than lithium in the positive electrode active material.

16. The non-aqueous electrolyte secondary battery according to claim 13, wherein the surface-treatment layer is formed by performing annealing after allowing the aluminum phosphate to adhere onto the lithium-containing transition metal oxide.

17. The non-aqueous electrolyte secondary battery according to claim 13, wherein the half-width of the peak in the vicinity of 595 cm$^{-1}$ determined by Raman spectroscopy of the positive electrode active material is 13.0 cm$^{-1}$ or greater.

18. A non-aqueous electrolyte secondary battery comprising: a positive electrode, a negative electrode, and a non-aqueous electrolyte containing a solute and a solvent, the positive electrode including a positive electrode active material comprising a lithium-containing transition metal oxide that contains lithium and cobalt and has a layered structure; wherein
the lithium-containing transition metal oxide is at least partially covered with a surface-treatment layer comprising a phosphate compound represented by the chemical formula $M^1PO_k$, where $M^1$ is at least one element capable of having a valency of 3 and k is an integer in a range of 2 to 4, and the lithium-containing transition metal oxide contains zirconium and magnesium in substantially equimolar amounts.

19. The non-aqueous electrolyte secondary battery according to claim 18, wherein the total content of the zirconium and magnesium is 5 mole % or less with respect to the total content of metal elements other than lithium in the positive electrode active material.

20. The non-aqueous electrolyte secondary battery according to claim 18, wherein the surface-treatment layer is formed by performing annealing after allowing the phosphate compound to adhere onto the lithium-containing transition metal oxide.

* * * * *